United States Patent
Turbeville

[15] 3,657,119
[45] Apr. 18, 1972

[54] POLLUTION CONTROL DEVICE

[72] Inventor: Joseph E. Turbeville, 4303 Jetton, Tampa, Fla. 33609

[22] Filed: May 22, 1970

[21] Appl. No.: 39,848

[52] U.S. Cl. ................................. 210/36, 210/40, 210/222, 210/242, 210/DIG. 21
[51] Int. Cl. ................................ C02b 9/02, E02b 15/04
[58] Field of Search .......... 210/36, 40, 222, 223, DIG. 21, 210/242; 252/62.54–62.56, 325

[56] References Cited

UNITED STATES PATENTS

| 2,637,384 | 1/1945 | Tymstra et al. | 210/1 |
| 3,358,838 | 12/1967 | Kosar et al. | 210/179 |
| 2,907,717 | 10/1959 | Hann | 252/325 |
| 3,494,862 | 2/1970 | Horowitz | 210/40 |
| 3,136,720 | 6/1964 | Baermann | 210/222 |
| 3,124,725 | 3/1964 | Leguillon | 210/222 X |

Primary Examiner—Reuben Friedman
Assistant Examiner—Thomas G. Wyse
Attorney—Stefan M. Stein

[57] ABSTRACT

A system for controlling pollution of a body of water which involves the collection, containment and relocation of the pollutant such as oil from the water surface. Buoyant, water resistant ferromagnetic particles are distributed over the polluted area to adhere to the oil. A magnetic field generated via a magnetic net or parallel series of magnetic grids is then applied to collect the oil coated particles and, if desired, transport them to a more convenient area for disposal.

13 Claims, 10 Drawing Figures

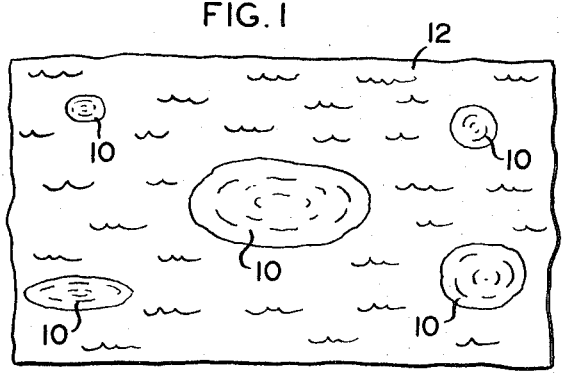
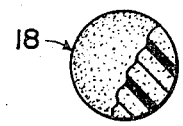
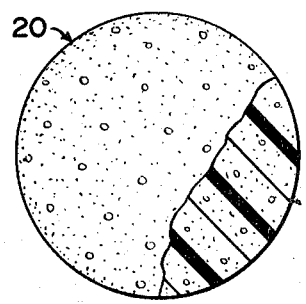
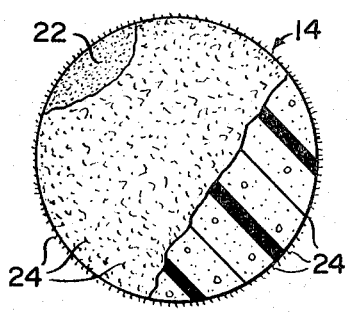
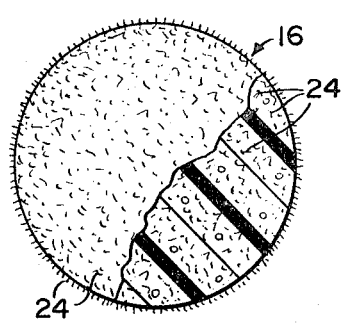
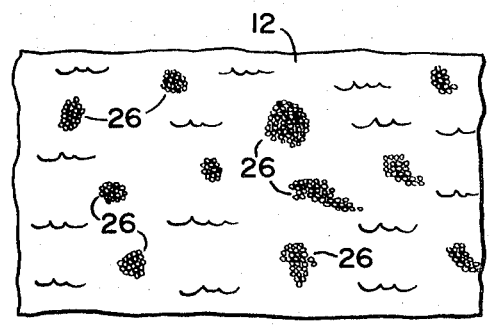
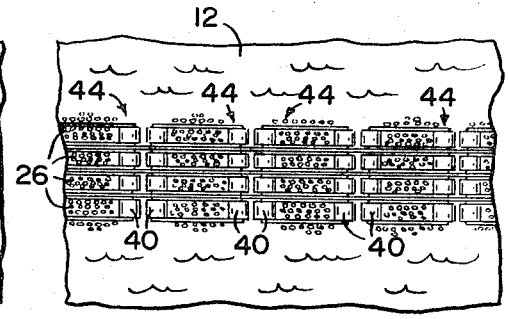
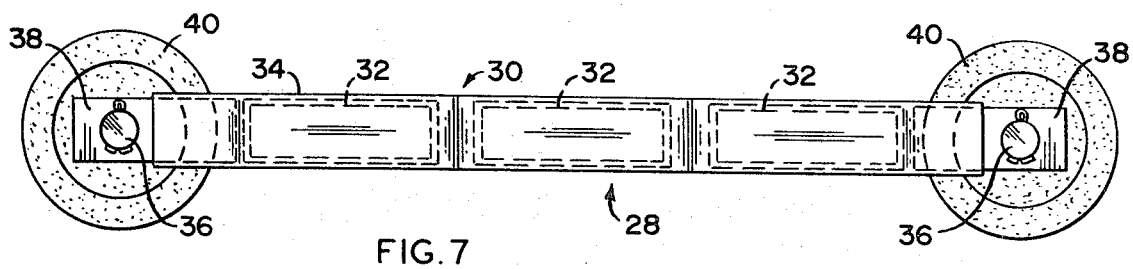

INVENTOR.
JOSEPH E. TURBEVILLE
BY
Stefan M. Stein
ATTORNEY.

POLLUTION CONTROL DEVICE

This invention relates to a system for collection, containment and relocation of pollutants floating on the surface of a body of water. More particularly, this invention relates to a system wherein the pollutant is first treated so as to react to a magnetic field and then subjected to a magnetic field via an electromagnetic or permanent magnetic device which acts as a containment means which may be capable of transporting the pollutant elsewhere.

The damage of property and marine and wild life caused by surface type pollutants, such as oil spillage in bodies of water is well known. In attempting to control such pollution, resort has been made to containment devices to limit the spread of the contaminated area. These devices are primarily designed to temporarily isolate the polluted surface areas so that steps can be taken to thereafter disperse the pollutant or to collect the pollutant for possible repurification and re-use. Usually these devices comprise physical barriers and nothing more. They are cumbersome and difficult to transport for any great distance in an emergency. They are also substantially incapable of transporting the pollutants to places more convenient for efficient and natural disposal of the pollutant.

Accordingly, it is an object of the present invention to provide a pollutant control system which utilizes both magnetic and mechanical principles for the control of surface pollutants in bodies of water.

Another object is to provide a pollution control system which is highly mobile and can be easily transported over large distances at short notice.

Still another object is to provide a pollution control system which is mobile over the water surface thereby allowing both containment and efficient transporting of pollutants over the surface of a body of water to a desired area of disposal.

A further object is to provide a pollution control system capable of maintaining oil or other surface pollutants in a buoyant condition on the water surface irrespective of changes in density of the body of water or the pollutant.

A still further object is to provide a pollution control system which converts the surface pollutant into a ferromagnetic layer which can be efficiently contained and readily transported to a desired area of disposal.

Another object is to provide a method of controlling surface pollution through the use of a plurality of ferromagnetic particles designed to be dispersed onto the polluted surface area thereby creating a ferromagnetic layer of the pollutant which may be contained or controlled.

Another object is to provide a method of containing surface pollutants by creating a ferromagnetic layer within the surface pollutants and then containing the layer by subjecting it to a magnetic field.

Another object is to provide a method of transporting surface pollutants to a desired area of disposal by transforming the pollutants into a ferromagnetic layer and then subjecting the layer to a magnetic field.

Another object is to provide a method of controllably containing, collecting and transporting surface pollutants in an economical, efficient and time saving manner.

Other objects of the invention will in part be obvious and will in part appear hereinafter.

In its broad aspects, the present invention pertains to controlling surface pollutants such as oil spillage on bodies of water. More specifically, the invention here involves the spreading of a plurality of buoyant, water resistant particles or beads which have been pre-treated to be ferromagnetic in character. After being spread, the particles have an inherent affinity for oil. An oily ferromagnetic layer is thereby created. A magnetic field is then applied to the ferromagnetic layer to effect containment, collection and transportation of the pollutant.

The particles used may comprise any low density expandable plastic beads such as polystyrene beads which are commercially available. One method for making such beads ferromagnetic, is to coat them after expansion with iron or like ferromagnetic material. Alternatively, the ferromagnetic material may be incorporated into the plastic before it is expanded. This latter approach enables easier storage and transport because of the smaller volume. The plastic is then expanded immediately prior to or simultaneously with their being spread onto the polluted surface of the body of water.

The creation of the ferromagnetic layer has additional advantages. It more positively maintains the pollutant in a cohesive body so that it can be more readily controlled. Also, if the pollutant is a low grade high density type fuel oil, which may have a natural tendency to sink in brackish water, the added buoyancy imparted by the particles will cause the oil to float. Indeed, since the density of oil and of water are functions of temperature, the added flotation imparted by the particles overcomes any adverse change in temperature of the surrounding environment.

The system of the present invention further includes a containment device capable of creating a magnetic field. The containment device has a "two pronged" capability in that it may be utilized as a barrier for the mere containment of the surface pollutant or alternatively it may be utilized to serve as a magnetic net or rake. In the latter form, it is capable of transporting the oily ferromagnetic layer over the surface of the body of water to a desired area of disposal.

In one embodiment of the containment device, a plurality of permanent magnet bars are arranged in spaced parallel fashion. Sections of such "bars" in interconnected or "chain" fashion are used to surround the polluted area. A plurality of these sections may be arranged in spaced parallel rows to form a grid-like magnetic net. Each of the rows of magnetic bars comprising the sections are spaced in pre-determined distance apart in order to take full effective advantage of the magnetic field created thereby. The bars are placed in opposed relationship relative to their interacting magnetic field so that efficient gathering of the particles and consequently the ferromagnetic layer is accomplished. Floats serve as support means for the magnetic grid sections and are mounted between each of the rows of magnetic bars. In order to protect the magnetic bars from deterioration encountered, each bar is covered with a protective sleeve or sheath made from any desired water resistant material.

Each of the magnetic bars is made from a ceramic material, or more precisely barium ferrite ceramic material and fitted with steel pole pieces. This material has the advantage of relatively high magnetic field strength and low density or weight characteristics. Any material having the desirable weight and magnetic field strength characteristics may be used instead of ceramic magnetic material. In order to increase the magnetic field strength, the ceramic bars are fitted in sandwich-like fashion between steel plates or "pole" pieces. Electromagnets may be used instead of the permanent magnets previously described.

An important structural feature of the containment device is that the individual sections be relatively short and be movably secured to one another. This allows the containment device to conform to the continuously changing surface configuration of the water. While it is well known the oil has a settling effect when present on the surface of a body of water, the surface is still capable of continuous movement and change due to wave swells. In view of this, the containment means should always be maintained in a contigious relationship to the water surface. This position of the magnetic field on the water surface thereby effectively controls the pollutant. If the containment device were to sink below the surface, the magnetic field, which has limited effective range, would loose its hold on the ferromagnetic layer. This would result in escape of the pollutant from the area of containment defined by the containment means whether it be in the form of a barrier or a magnetic net.

The invention accordingly comprises the several steps and the relation of one or more of such steps with respect to each of the others and the apparatus and embodying features of construction, combinations of elements and arrangements of parts which are adapted to effect such steps all as exemplified in the following detailed disclosure, and the scope of the invention will be indicated in the claims.

For a fuller understanding of the nature and objects of the invention, reference should be had to the following detailed description taken in connection with the accompanying drawings in which:

FIG. 1 is a top plan view of a body of water containing surface pollutants.

FIGS. 2 and 5 are sectional views of one embodiment of the ferromagnetic particles of the present invention.

FIGS. 3 and 4 are sectional views of another embodiment of the ferromagnetic particles.

FIG. 6 is a top plan view of the surface of a body of water wherein the ferromagnetic particles of the present invention are applied to the surface pollutants on the water.

FIG. 7 is a side view of one magnetic grid section of the containment means of the present invention.

FIG. 9 is a top plan view of the surface of the body of water wherein the containment means of the present invention is shown gathering the oil coated ferromagnetic particles on the surface of the body of water.

Similar reference characters refer to similar parts throughout the several views of the drawings.

Figure 8:
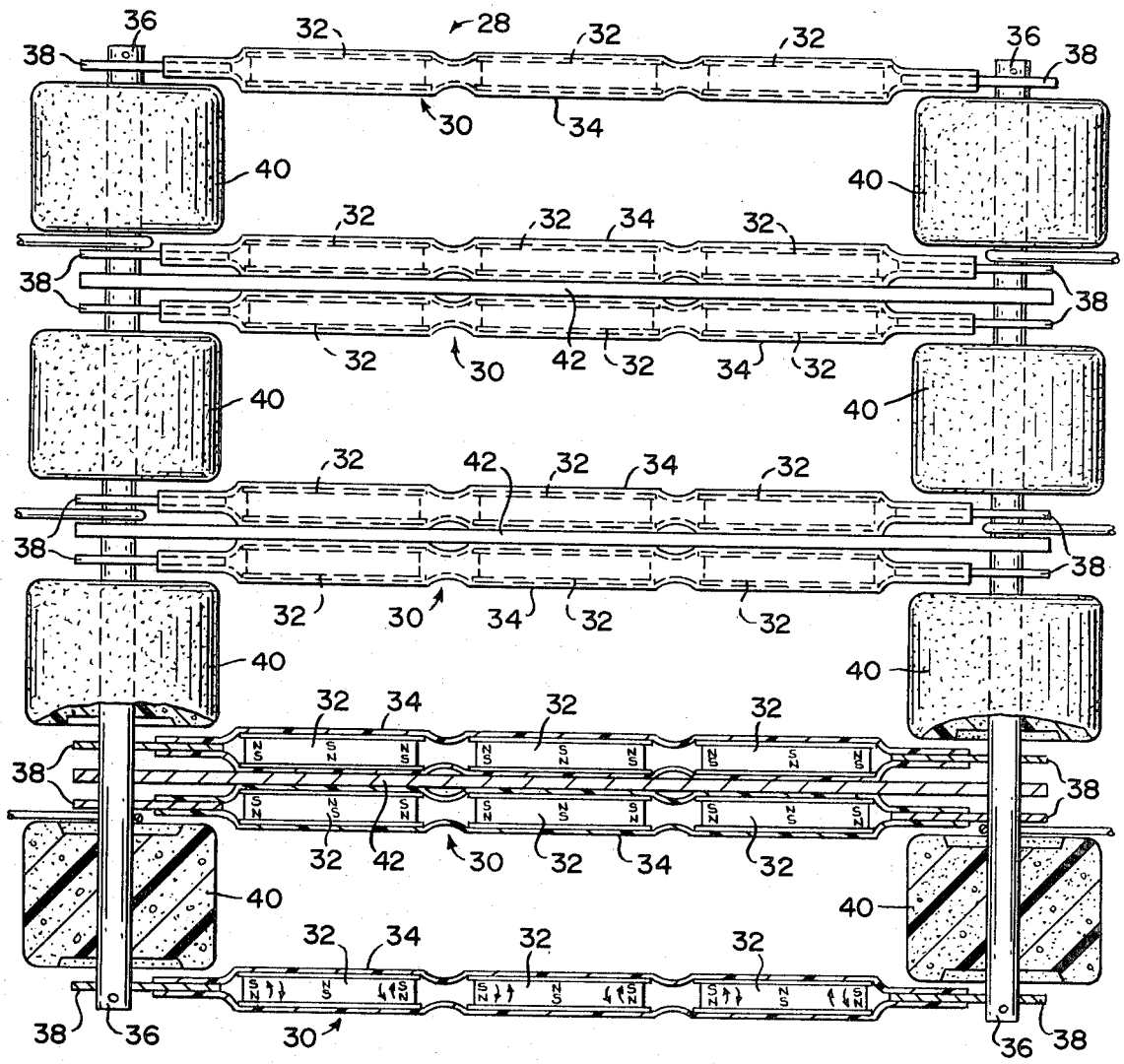
FIG. 8 is a top sectional view of the adjacently mounted magnetic grid sections of the containment means of the present invention.

This invention is directed towards a system for controlling surface pollutants in bodies of water through the use of both magnetic and mechanical principles. The system includes the use of a large number of ferromagnetic particles which are dispersed over the polluted area. A ferromagnetic layer is formed due to the adhesion between the particles and the pollutant. The system further includes means to control the layer by a containment device which creates the magnetic field. The layer is subjected to the magnetic field and may thereby be contained and transported to a desired disposal area.

FIG. 1 shows areas of pollution 10, such as oil on the surface of a body of water 12 such as a lake, ocean, river or the like. In controlling such surface pollutants, ferromagnetic particles 14 and 16 are dispersed onto the polluted area 10. The ferromagnetic particles are formed by pre-treating polystyrene beads in an unexpanded form 18 or expanded form 20. More specifically, particle 14 may be made ferromagnetic by coating it with adhesive 22 and metal fillings 24. Alternatively, particle 16 is formed by inserting metal filings 24 into bead 18 while in an unexpanded state. Beads 18 and 20 are commercially available on the market and are particularly applicable to the present invention due to their buoyancy, lightweight and affinity for such surface pollutants as oil.

Ferromagnetic particles 16 may be expanded simultaneous to dispersal in the polluted area 10. Therefore, large numbers of these ferromagnetic particles 16 can be efficiently and rapidly transported to a sight wherein oil spillage or other surface pollutants exist.

An interaction will occur between the ferromagnetic particles 14 or 16 and the polluted surface area 10 thereby creating a ferromagnetic layer 26. This layer serves a dual function of maintaining the pollutant in a buoyant condition on the surface of the water and causing the pollutant to react to an externally applied magnetic field.

As explained above, the ferromagnetic film 26 is now subject to a magnetic field. Accordingly, an important part of this invention is the containment means used to contain, collect, and transport the formed ferromagnetic film 26 thereby allowing the surface pollutants to be disposed of in any desired disposal area.

FIGS. 7 and 8 show the containment means generally indicated as 28. The containment means comprises a plurality of substantially parallel arranged rows 30 of magnetic bars 32. The bars 32 are made of ceramic material sandwiched between pole pieces 33 and are arranged in opposing relation within a plastic or like water protective material sleeve 34. Rows 30 are movably mounted between rod 36 by means of link members 38 thereby allowing pivotal movement of each extremity of row 30 relative to shafts 36.

The containment means is supported in floating relation to the water surface 12 by means of floats 40 interspaced between the rows 30 and mounted on shaft 36 as shown in FIG. 8. Support rods 42 also extend between shafts 36 in substantially parallel relation to one another and are movably mounted on shafts 36 similar to link members 38.

FIGS. 7 and 8 show the rods 30 arranged in substantially parallel relation to form a single section generally indicated as 44. Accordingly, FIG. 9 shows the containment means 28 having a plurality of sets arranged in end-to-end relation to form a barrier configuration designed to contain the pockets of ferromagnetic layers 26 in a restricted area.

In FIG. 8, it is seen that rows 30 are spaced in predetermined distance from one another along the shafts 36 in order that maximum use may be made of the magnetic 32 based upon the range of their magnetic field. When the containment means 28 is positioned in the surface of the polluted body of water 12, the magnetic field serves to attract the ferromagnetic layers 26. FIG. 9 therefore shows the collection of the ferromagnetic layers 26 and the containment of the individual particles about and between the spaced rows 30.

Figure 10:
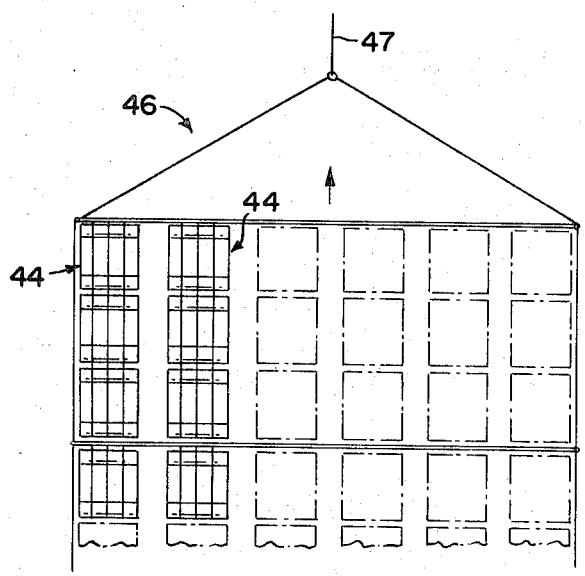
FIG. 10 is a top plan view of the containment means arranged in the form of a collecting net.

FIG. 10 shows the containment means of the present invention arranged in a grid-like configuration to form a "magnetic net" generally indicated as 46. The sections of rows 30 are themselves arranged in parallel rows wherein each row contains a plurality of sections 44. As explained with reference to FIG. 7 and 8, each section 44 in a given row is movably connected to immediately adjacent sections so that the formed magnetic net 46 can readily conform to the continuously changing surface of the water 12. In the configuration of the containment means shown in FIG. 10, the magnetic net 46 is capable of containment and collection of the ferromagnetic film 26. The net 26 has the additional capability of transporting the collected layer by means of towing or dragging of the net 46 over the water surface by means of line 47. Therefore, the collected ferromagnetic layer 26 may be transported to a desired disposal area. There, it is removed from the net 46 by merely increasing the towing speed of the net to a point where the force of the water on the collected particles is greater than the force exerted on them by the magnetic field. The particles are thereby pulled from the net and disposed of along with the ferromagnetic film as desired.

In use, the system provides an efficient manner of controlling surface pollutants such as oil spillage from tankers or off-shore drilling rigs. More specifically, when a polluted surface area is located, the pre-treated ferromagnetic particles are sped to the scene by any suitable vehicle. The particles are then quickly dispersed over the polluted surface area. The ferromagnetic layer is thereby formed by interaction between the buoyant ferromagnetic particles and the surface pollutant. The layer can now be controlled by a magnetic field. Therefore, the magnetic net or barrier which may be easily transported to the polluted surface area, is placed on the water surface and exposed to the layer. The layer is collected by magnetic attraction and contained in a given area. Alternatively, the collected layer may be efficiently and rapidly transported by merely towing the net by any suitable vehicle to a desired area of disposal.

It will thus be seen that the objects set forth above, among those made apparent from the preceding description, are efficiently attained and, since certain changes may be made in carrying out the invention and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention, which, as a matter of language, might be said to fall therebetween.

Now that the invention has been described,
What is claimed is:

1. A system for controlling pollutants on the surface of a body of liquid said system comprising: containment means for producing a magnetic field, supporting means to maintain said containment means in floating position on the surface of said liquid; a plurality of plastic particles having an affinity for said pollutants, magnetizable means attached to said particles to cause said particles to be influenced by said magnetic field, said particles being made from a sufficiently low density material so as to be maintained in floating relation to said surface of said liquid; a magnetic layer formed within the surface of the liquid body by interaction of said particles with the pollutant, whereby said magnetic layer is contained by subjecting said particles to said containment means.

2. A control system as in claim 1 wherein said magnetizable means include ferromagnetic material coated on the exterior of said particles.

3. A control system as in claim 1 wherein said magnetizable means include magnetic material inserted into said particles.

4. A control system as in claim 1 wherein said particles are formed from expandable low density plastic.

5. A control system as in claim 1 wherein said containment means comprises a plurality of interconnected magnets arranged in a grid configuration; whereby said containment means is capable of being moved along the surface of the liquid.

6. A control system as in claim 1 wherein said containment means comprises a plurality of magnets arranged in a plurality of rows, said plurality of rows movably connected in parallel relation to one another said plurality of rows arranged in a grid configuration to form a magnetic grid section, wherein each section is movably connected to adjacent sections.

7. A control system as in claim 1 wherein said containment means comprises a plurality of ceramic material magnets arranged in one of at least two parallel rows, said rows positioned in a pre-determined spaced distance from one another; float means positioned between said parallel rows of magnets, whereby said containment means is maintained in a floating position on the surface of said body of liquid.

8. A method of controlling surface pollutants on a body of liquid, said method comprising the steps of:
   a. treating a plurality of low density plastic material particles having an affinity for said pollutants so as to be reactive to a magnetic field,
   b. dispersing said plurality of particles onto a pre-determined surface of said liquid,
   c. containing said dispersed particles into a collected mass by subjecting said particles to a magnetic field, and
   d. positioning said collected mass of particles by locating said magnetic field in a pre-determined position on the surface of said liquid.

9. A method of controlling surface pollutants as in claim 8 wherein treating of said plurality of particles includes coating said particles with a ferromagnetic material.

10. A process of controlling surface pollutants as in claim 8 wherein treating of said plurality of particles includes inserting ferromagnetic material directly into said particles.

11. A process for controlling surface pollutants as in claim 8 wherein said process further comprises the steps of forming said particles from polystyrene and wherein treating said particles includes inserting ferromagnetic material into said polystyrene particles when said particles are in an unexpanded state.

12. A method of controlling surface pollutants as in claim 8 wherein positioning of said particles includes moving said magnetic field relative to said surface, whereby said particles are disposed at a pre-determined location.

13. A process for controlling surface pollutants as in claim 8 wherein said mass of particles are dispersed by moving said magnetic field relative to said liquid at a speed sufficient to create a force on said particles greater than any binding force on said particles due to said magnetic field.

* * * * *

Notice of Adverse Decision in Interference

In Interference No. 98,221 involving Patent No. 3,657,119, J. E. Turbeville, POLLUTION CONTROL DEVICE, final judgment adverse to patentee was rendered Feb. 19, 1974, as to claims 8, 9, 10 and 11.

[*Official Gazette August 13, 1974.*]